(12) United States Patent
Andresen

(10) Patent No.: US 11,845,171 B1
(45) Date of Patent: Dec. 19, 2023

(54) IMPACT TOOL AND METHOD

(71) Applicant: Harrold Andresen, Duncanville, TX (US)

(72) Inventor: Harrold Andresen, Duncanville, TX (US)

( * ) Notice: Subject to any disclaimer, the term of this patent is extended or adjusted under 35 U.S.C. 154(b) by 282 days.

(21) Appl. No.: 16/857,244

(22) Filed: Apr. 24, 2020

(51) Int. Cl.
| | |
|---|---|
| *B25D 9/14* | (2006.01) |
| *B25D 9/00* | (2006.01) |
| *B25D 17/00* | (2006.01) |
| *B23B 45/04* | (2006.01) |
| *B25F 5/02* | (2006.01) |

(52) U.S. Cl.
CPC ............ *B25D 9/14* (2013.01); *B23B 45/04* (2013.01); *B25D 9/005* (2013.01); *B25D 17/005* (2013.01); *B25F 5/02* (2013.01)

(58) Field of Classification Search
CPC ........ B25D 9/14; B25D 9/005; B25D 17/005; B25F 5/02; B23B 45/04
See application file for complete search history.

(56) References Cited

U.S. PATENT DOCUMENTS

| | | | | |
|---|---|---|---|---|
| 1,941,565 A * | 1/1934 | Mandl | ...................... | B25B 19/00 |
| | | | | 81/121.1 |
| 4,253,353 A * | 3/1981 | Symbol | ................... | B25B 19/00 |
| | | | | 81/124.7 |
| 5,297,458 A * | 3/1994 | Smith | ..................... | B25B 13/06 |
| | | | | 81/124.2 |
| 6,745,649 B1 * | 6/2004 | Liao | ........................ | B25B 13/06 |
| | | | | 81/121.1 |
| 7,024,973 B2 * | 4/2006 | Kobert | .................... | B25B 13/48 |
| | | | | 81/124.7 |
| 7,677,143 B1 * | 3/2010 | Piserchio | ................ | B25B 13/06 |
| | | | | 81/466 |
| 7,975,578 B2 * | 7/2011 | Youtsey | ................... | B25B 13/06 |
| | | | | 81/467 |
| 9,387,574 B2 * | 7/2016 | East | ...................... | B25B 13/065 |

(Continued)

OTHER PUBLICATIONS

Real Tool Reviews, Craftsman 48-pc Thread Restorer Master Kit (Snap-on RTD48 / MAC TRCOMBO-48), Feb. 5, 2015, https://www.youtube.com/watch?v=TC31LEqgUOw (Year: 2015).*

(Continued)

*Primary Examiner* — Thomas M Wittenschlaeger
*Assistant Examiner* — Katie L Gerth
(74) *Attorney, Agent, or Firm* — GUGLIOTTA & GUGLIOTTA LPA

(57) ABSTRACT

An oxygen sensor socket kit provides an air impact driver and at least one slotted socket forming an annulus forming an inside surface with a plurality rectangular flats parallel to and symmetrically arranged around a central axis. The slot is slot formed through the socket sidewall positioned in place of one or a portion of one of the rectangular flats. An outer surface incorporates at least one radially offset protrusion forming a wing body and having a planar striking surface that lies along a radial projection from the central axis on a plane that intersects central axis. A striking surface forms one or more recesses of a concave shape to receive in a rounded tool tip an air impact driver. The driver has an offset distal portion having an angular offset sufficient to allow a direction of an impact force directly laterally offset from a centerline of the output shaft.

13 Claims, 7 Drawing Sheets

(56) References Cited

U.S. PATENT DOCUMENTS

| | | | | |
|---|---|---|---|---|
| 2002/0092383 A1* | 7/2002 | Nezigane | ............... | B25B 13/481 |
| | | | | 81/121.1 |
| 2008/0011128 A1* | 1/2008 | Stephens | ............. | B25B 13/5091 |
| | | | | 81/124.2 |
| 2008/0289460 A1* | 11/2008 | Whitehead | ............... | B25B 13/06 |
| | | | | 81/463 |
| 2012/0138879 A1* | 6/2012 | Pell | ......................... | B25C 11/00 |
| | | | | 254/18 |
| 2012/0304833 A1* | 12/2012 | Skogerboe | ............. | B25B 13/08 |
| | | | | 81/119 |

OTHER PUBLICATIONS

Catus Maximus, Harbor Freight Professional Oxygen Sensor & Diesel Injector Socket Set Review, Jun. 10, 2018, https://www.youtube.com/watch?v=-Mj-tcTxeNY&t=29s (Year: 2018).*

* cited by examiner

IMPACT TOOL AND METHOD

RELATED APPLICATIONS

There are no previously filed, nor currently any co-pending applications, anywhere in the world.

BACKGROUND OF THE INVENTION

1. Field of the Invention

The present invention relates to impact tools and methods, and in particular, to compact devices adapted for the removal of oxygen sensors or the like.

2. Description of the Related Art

Various devices for and methods of loosen seized threaded fasteners by mechanical or thermal shock are known. For example, the fastener can be heated with a simple torch which causes a differential thermal expansion that can loosen the fastener. Alternatively, hitting the fastener with a hammer may break a bond that prevents loosening. However, a hammer blow will often produce an ineffective axial shock wave without applying a loosening torque.

Of considerable relevance is U.S. Pat. No. 7,677,143, issued to Piserchio, in which an impact tool is provided that fits around a nut or bolt head. The tool has an annular section with an outside and an inside surface encircling the central axis of the fastener. The outside surface has at least one recess with a striking surface and guide surface. The striking surface lies in a plane intersecting the central axis. With the annular section placed around the fastener, the striking surface intersects a predetermined radial projection from the central axis. The striking surface is struck at a right angle to the predetermined radial projection to turn the nut or bolt head.

While the '143 patent provides some methods and devices for utilizing air impact tools for removal of seized fasteners are incorporated into this invention in combination, other elements are different enough as to make the combination distinguished over the prior art.

Such known impact tool driven sockets have drawbacks and are simply unusable in certain circumstances, especially those where the fastener to be removed is in tight quarters or otherwise not directly accessible. By way of example, and not meant as a limitation, modern vehicle exhaust systems are increasing the use of oxygen sensors ("O2 sensors") in order to modulate air/fuel mixtures and to optimize both performance as well as catalytic converter operations. With such exhaust systems secondary oxygen sensors may be located within the exhaust, at the catalytic converter, at the muffler, etc. The O2 sensors are threadingly connected to the exhaust component and have cabling pigtails extending therefrom. However, after extend use these O2 sensors can become seized or fused, and accessing them for removal is difficult for a number of reasons, including difficulty of direct access and having a form factor that makes the use of a socket wrench or a tool of the '143 patent impossible.

Consequently, a need has been felt for providing tools for and methods of accessing seized threaded fasteners that are accessible from a direct line of sight or that has a form factor incongruous with a traditional socket.

SUMMARY OF THE INVENTION

It is thus an object of the present invention to provide impact tools and methods adapted for the removal of oxygen sensors or the like.

It is a feature fo the present invention to provide a specialty socket attachment including radially offset protrusions adapted for interfacing with an air impact tool to provide a rotational driving force in a manner offset form a centerline of the seized fastener.

Briefly described according to a preferred embodiment of the present invention, an oxygen sensor socket kit provides an air impact driver and at least one slotted socket forming an annulus forming an inside surface with a plurality rectangular flats parallel to and symmetrically arranged around a central axis. The slot is slot formed through the socket sidewall positioned in place of one or a portion of one of the rectangular flats. An outer surface incorporates at least one radially offset protrusion forming a wing body and having a planar striking surface that lies along a radial projection from the central axis on a plane that intersects central axis. A striking surface forms one or more recesses of a concave shape to receive in a rounded tool tip an air impact driver. The driver has an offset distal portion having an angular offset sufficient to allow a direction of an impact force directly laterally offset from a centerline of the output shaft.

An advantage of the present invention allows for removal of seized fasteners from tight quarters or where otherwise not directly accessible.

Another advantage of the present invention is to allow use with removal of threaded objects in which their form factor prevents the use of closed socket style tools.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

For purposes of the present disclosure the terms "a" and "an" herein do not denote a limitation of quantity, but rather denote the presence of at least one (1) of the referenced items. Further for purposes of the present disclosure the terms "in", "out", "left" "right", "up" or "down" are all spacial and functionally relative directions used to aid in the description to best explain the principles of the invention and its practical application, and to aid others skilled in the art to best utilize the invention and are not meant to be limiting to any particular orientation. It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Figure 1:
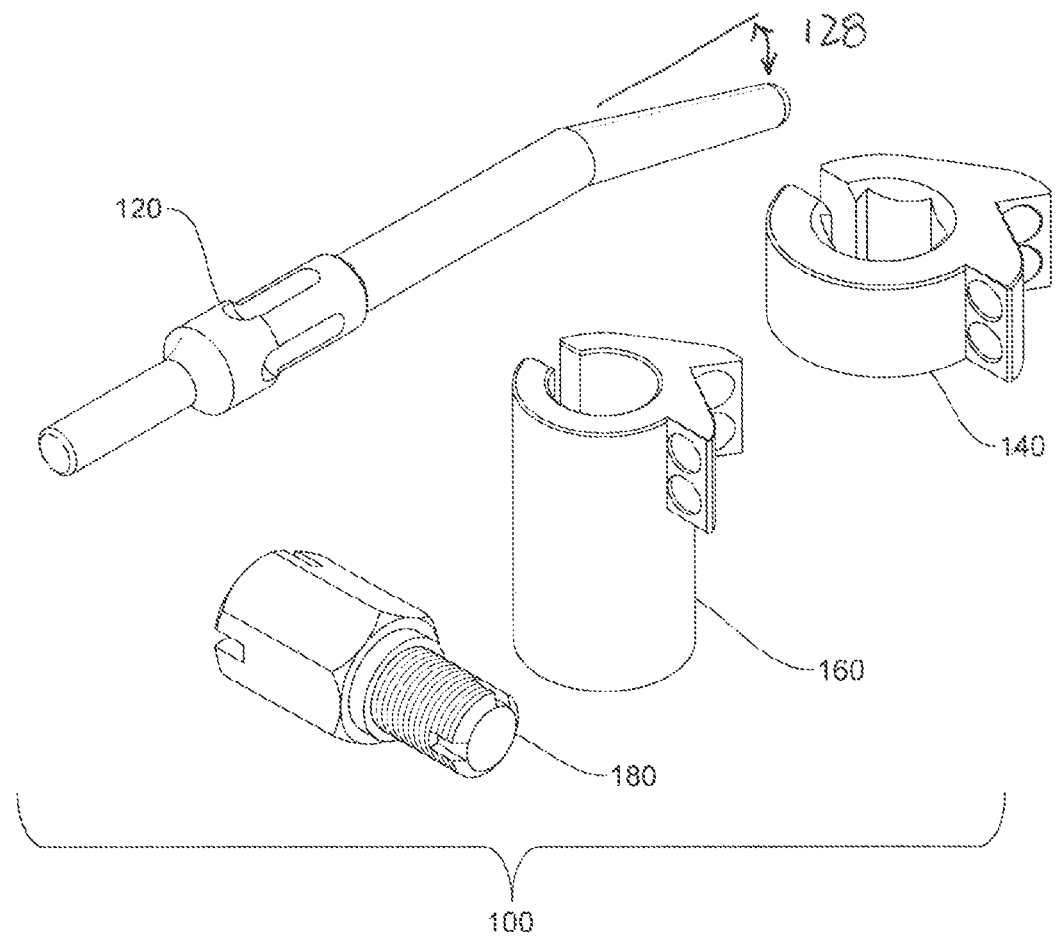
FIG. 1 is a perspective view of an oxygen sensor socket kit 100 according to a preferred embodiment of the present invention.

Referring now in conjunction with FIG. 1, an oxygen sensor socket kit, generally noted as 100, is shown according to a preferred embodiment of the present invention. The socket kit 100 may include: an air impact driver 120; a short slotted socket 140; a long slotted socket 160; and a thread chaser 180.

Figure 2:
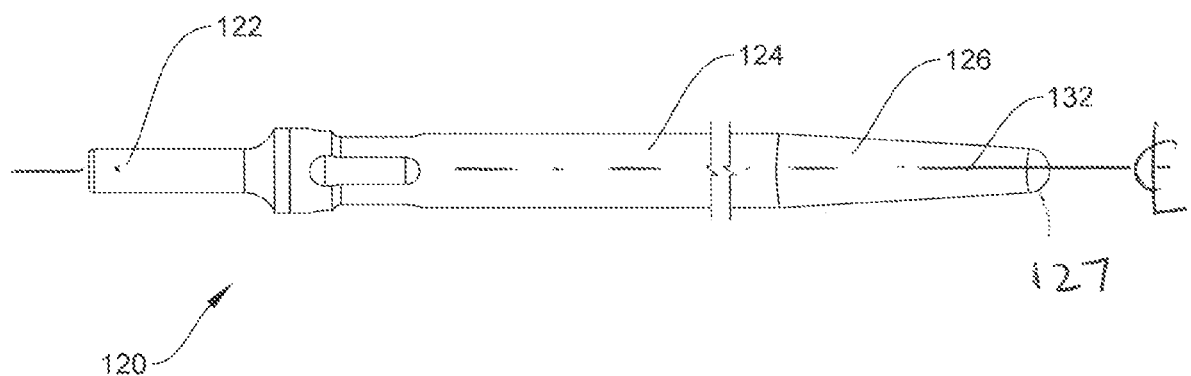
FIG. 2 is an elevational view of an air impact driver 120 for use therein.
Figure 3A:
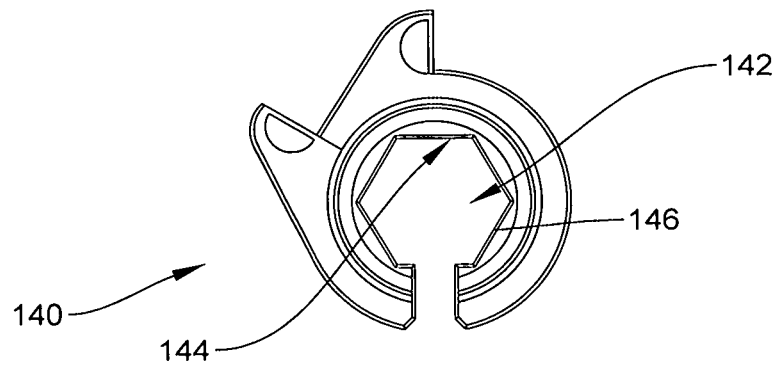
FIG. 3A is a top plan view of a short slotted socket 140 for use therewith.
Figure 3B:
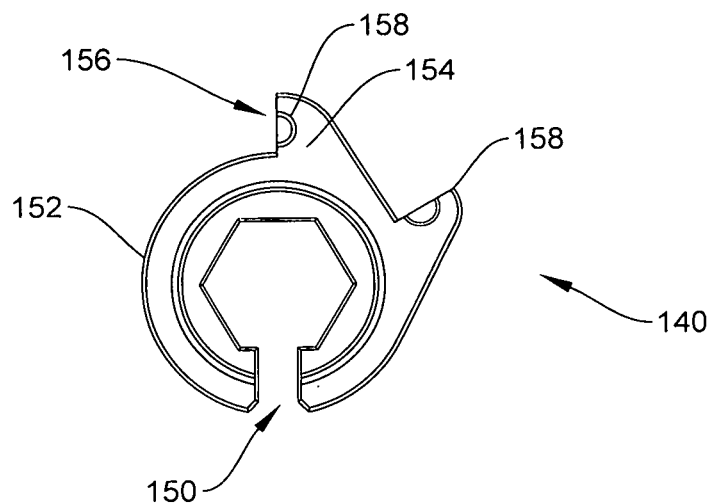
FIG. 3B is a bottom plan view thereof.
Figures 3C, 3D:
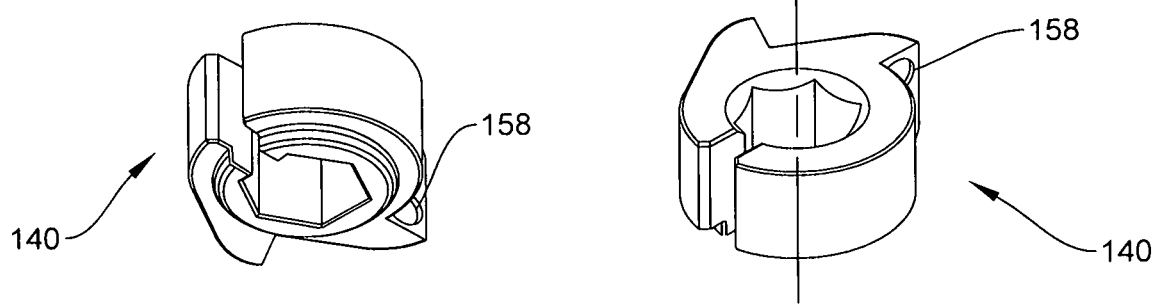
FIG. 3C is an upper perspective view thereof.
FIG. 3D is a lower perspective view thereof.
Figure 4A:
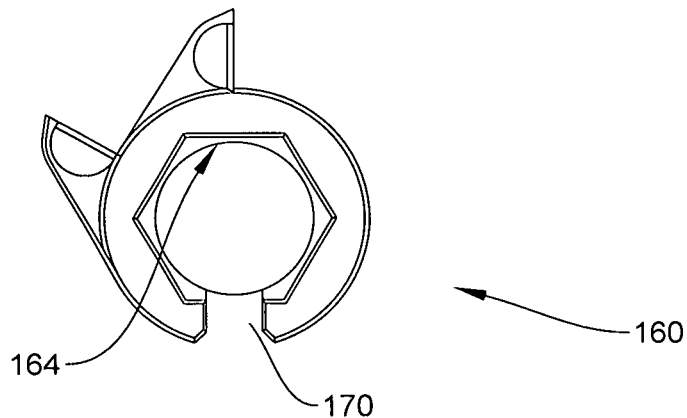
FIG. 4A is a top plan view of a long slotted socket 160 for use therewith.
Figure 4B:
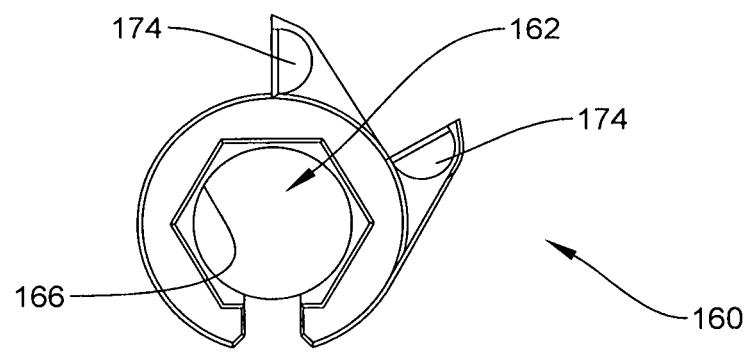
FIG. 4B is a bottom plan view thereof.
Figure 4C:
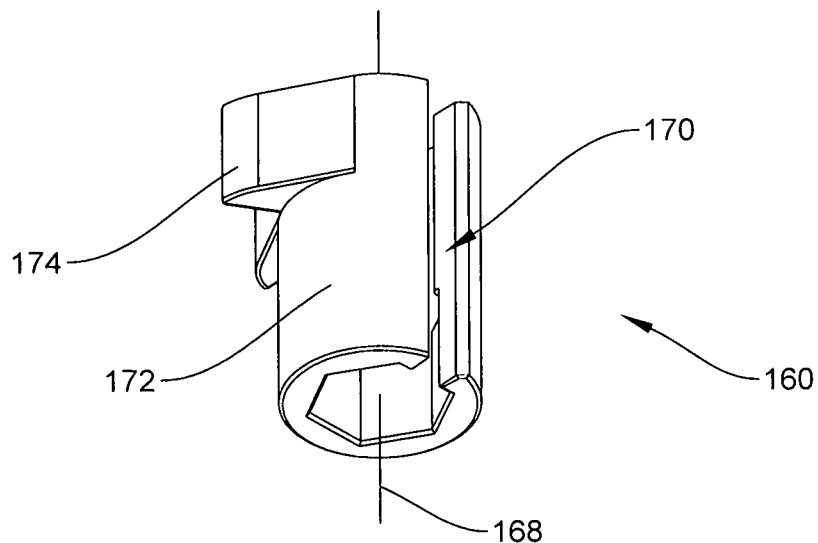
FIG. 4C is an upper perspective view thereof.
Figure 4D:
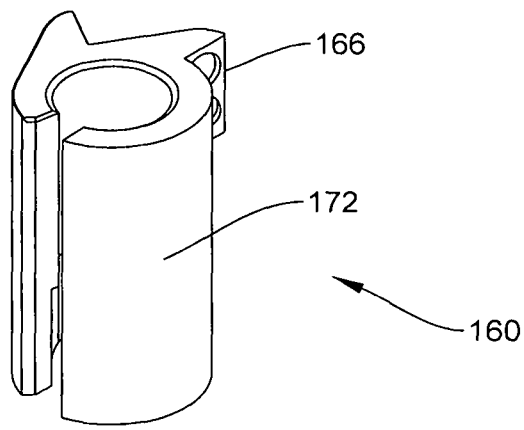
FIG. 4D is a lower perspective view thereof.
Figure 4E:
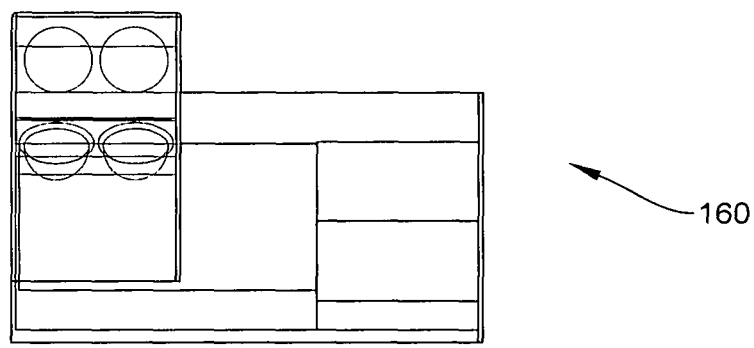
FIG. 4E is a side elevational view thereof.
Figure 5A:
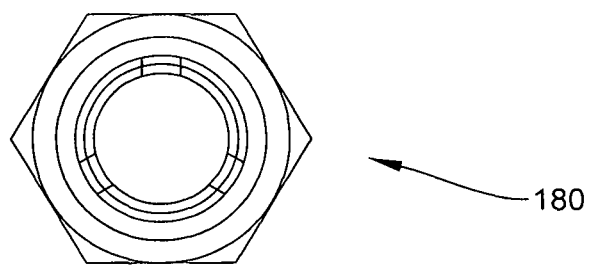
FIG. 5A is a top plan view of a thread chaser 180 for use therewith.
Figure 5B:
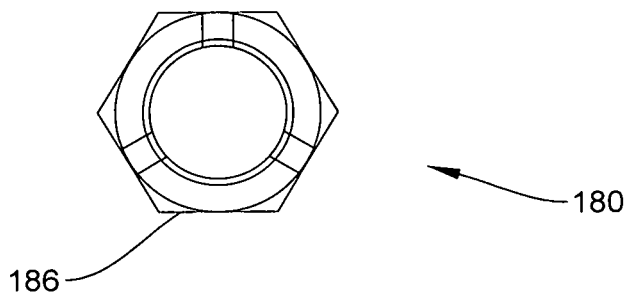
FIG. 5B is a bottom plan view thereof.
Figure 5C:
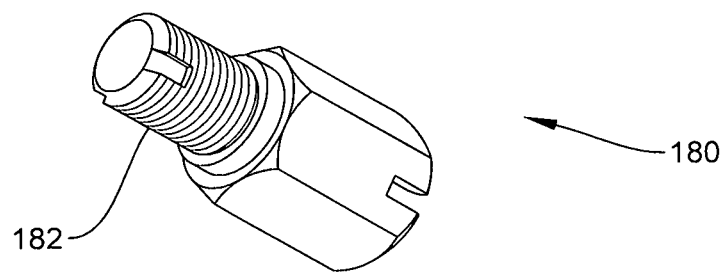
FIG. 5C is an upper perspective view thereof.
Figure 5D:
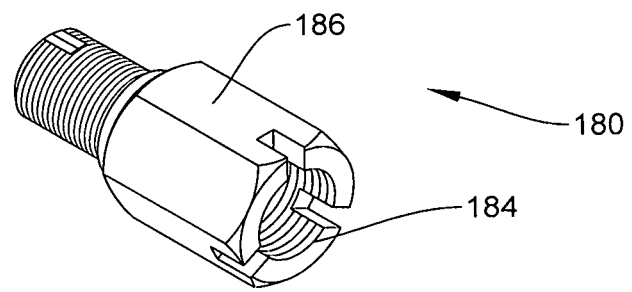
FIG. 5D is a lower perspective view thereof.
Figure 5E:
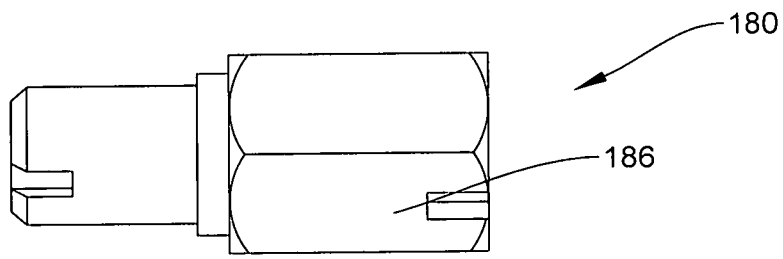
FIG. 5E is a side elevational view thereof.

The air impact driver 120 is shown in greater detail in conjunction with FIG. 2. The air impact driver 120 has a proximal attachment end 122 adapted for connection with an otherwise conventional pneumatic impact wrench or driver tool (not shown). Such an impact wrench (also known as an impactor, impact gun, air wrench, air gun, rattle gun, torque gun, windy gun) is a socket wrench power tool designed to deliver high torque output with minimal exertion by the user, by storing energy in a rotating mass, then delivering it suddenly to the output shaft 124. While compressed air is the most common power source, electric or hydraulic power is also used, with cordless electric devices becoming increasingly popular. The air impact driver 120 provides an output shaft 124 that includes an offset distal portion 126 that terminates in a rounded tool tip 127. The offset distal portion 126 provides an angular offset 128 sufficient to allow the direction of an impact force in a directly laterally offset 130 from the centerline 132 of the output shaft 124.

Referring in conjunction with FIG. 3A through 3D, the short slotted socket 140 is shown in greater detail. The short slotted socket 140 forms an annulus 142 forming an inside surface 144 having a plurality of substantially rectangular flats 146, each design to mate with a flat portion of a hex nut or bolt head (not shown). The flats 146 are parallel to and symmetrically arranged around central axis 148. The socket 140 further forms a slot 150 providing continuous fluid communication with the annulus 142. The slot 150 may be positioned in place of one or a portion of one of the rectangular flats 146.

The socket 140 further forms an outer surface 152. The outer surface 152 further incorporates at least one radially offset protrusion 154. The configuration shown herein provides two such radially offset protrusion 154, each positioned in spaced manner from one another at a distance coordinating with the distance between the tools internal rectangular flats 146. Each offset protrusion 154 forms a wing body forming a planar striking surface 156 that lies along a radial projection from central axis 148. In particular, striking surface 156 lies in a plane that intersects central axis 148. It will be noticed that each of the striking surfaces 148 also point toward (align with) the center of one of the flats 146, although such alignment is optional and in other embodiments the striking surface 156 may point to any other position along the periphery of inside surface.

Each striking surface 156 may further form one or more recess 158. It is preferred that each recess 158 may form a concave shape that coordinates with and may receive the rounded tool tip 127 of the air impact driver 120.

Referring in conjunction with FIG. 4A through 4D, the long slotted socket 160 is shown in greater detail. The long slotted socket 160 forms an annulus 162 forming an inside surface 164. The 164 having a plurality of substantially rectangular flats 166, each design to mate with a flat portion of a hex nut or bolt head (not shown). The flats 166 are parallel to and symmetrically arranged around central axis 168. The socket 160 further forms a slot 170 providing continuous fluid communication with the annulus 162. The slot 170 may be positioned in place of one or a portion of one of the rectangular flats 166.

The socket 160 further forms an outer surface 172. The outer surface 152 further incorporates at least one radially offset protrusion 174. The configuration shown herein provides two such radially offset protrusion 174, each positioned in spaced manner from one another at a distance coordinating with the distance between the tools internal rectangular flats 166. Each offset protrusion 174 forms a wing body forming a planar striking surface 176 that lies along a radial projection from central axis 168. In particular, striking surface 176 lies in a plane that intersects central axis 168. It will be noticed that each of the striking surfaces 168 also point toward (align with) the center of one of the flats 166, although such alignment is optional and in other embodiments the striking surface 176 may point to any other position along the periphery of inside surface.

Each striking surface 176 may further form one or more recess 158. It is preferred that each recess 178 may form a concave shape that coordinates with and may receive the rounded tool tip 127 of the air impact driver 120.

It is intended that the short slotted socket 140 and the long slotted socket 160 have similar overall configurations, but with the long slotted socket 160 having a larger overall vertical height 179 than a shorter overall vertical height 159 of the short slotted socket 140.

Referring in conjunction with FIG. 5A through 5E, the thread chaser 180 is shown in greater detail. The thread chaser 180 is intended to provide a male cutting tap 182 adapted to clean, re-form and restore existing female threads. Further, the thread chaser 180 may provide a female cutting tap 184 adapted to clean, re-form and restore existing male threads. A hexagonal outer surface 186 may be provided such as to be matingly received within the annulus 142 of the short slotted socket 140 or the annulus 162 of the long slotted socket 160.

Figure 6:
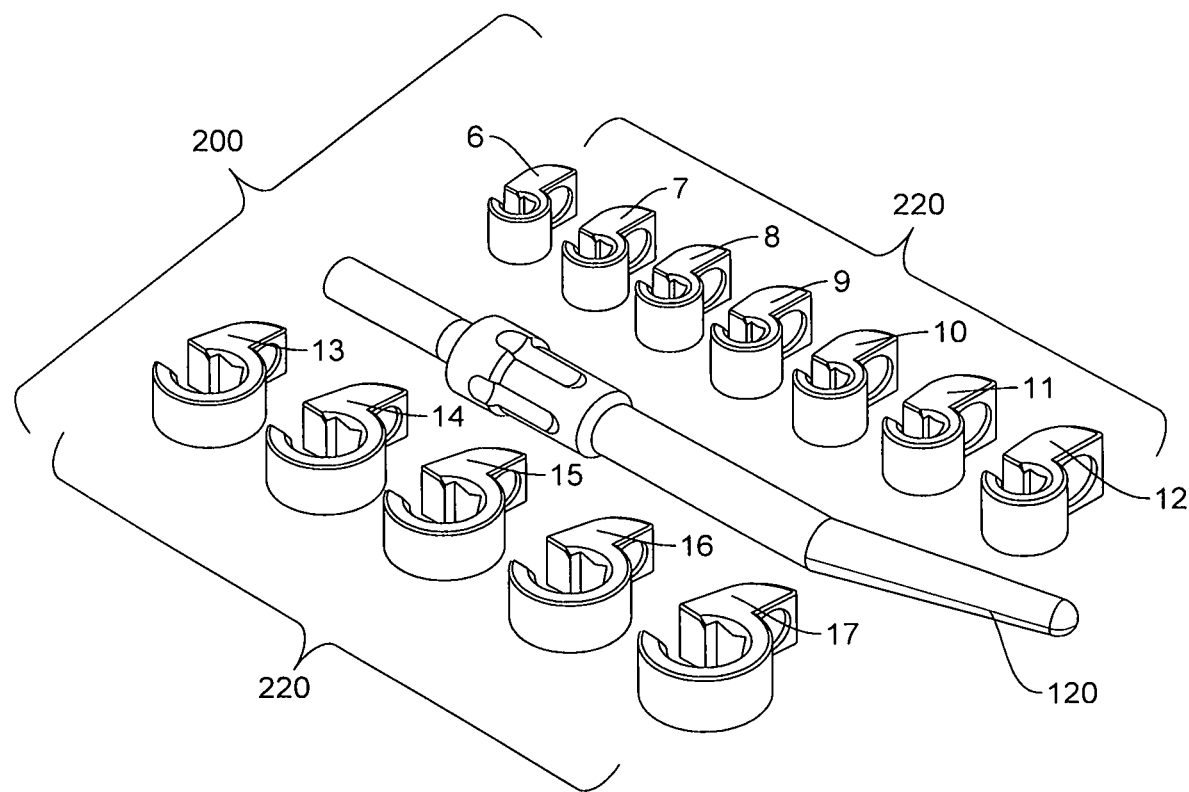
FIG. 6 is a perspective view of a socket kit 200 according to a first exemplary alternate embodiment of the present invention.

It should be further considered that many modifications and variations of the present invention are possible in light of the above teachings. It is therefore to be understood that within the scope of the appended claims, the invention may be practiced otherwise than as specifically described. By way of example, and not meant as a limitation, FIG. 6 provides a perspective view of a socket kit 200 according to a first exemplary alternate embodiment of the present invention. In such an adaptation an air impact driver 120 is provided in conjunction with a plurality of slotted sockets 220, each adapted for use with a hexagonal head fastener of a different size. Each slotted socket 220 forms an annulus 222 forming an inside surface 144 having a plurality of substantially rectangular flats 226, each design to mate with a flat portion of a hex nut or bolt head (not shown). The flats 226 are parallel to and symmetrically arranged around central axis 228. The socket 220 further forms a slot 230 providing continuous fluid communication with the annulus 222. The slot 230 may be positioned in place of one or a portion of one of the rectangular flats 226.

The socket 220 further forms an outer surface 232. The outer surface 232 further incorporates a radially offset protrusion 234. The offset protrusion 234 forms a wing body forming a planar striking surface 236 that lies along a radial projection from central axis 228. In particular, striking surface 236 lies in a plane that intersects central axis 228. It will be noticed that each of the striking surfaces 228 also point toward (align with) the center of one of the flats 226, although such alignment is optional and in other embodiments the striking surface 236 may point to any other position along the periphery of inside surface.

The striking surface 236 may further form one or more recess 238. It is preferred that each recess 238 may form a concave shape that coordinates with and may receive the rounded tool tip 128 of the air impact driver 120.

Figure 7:
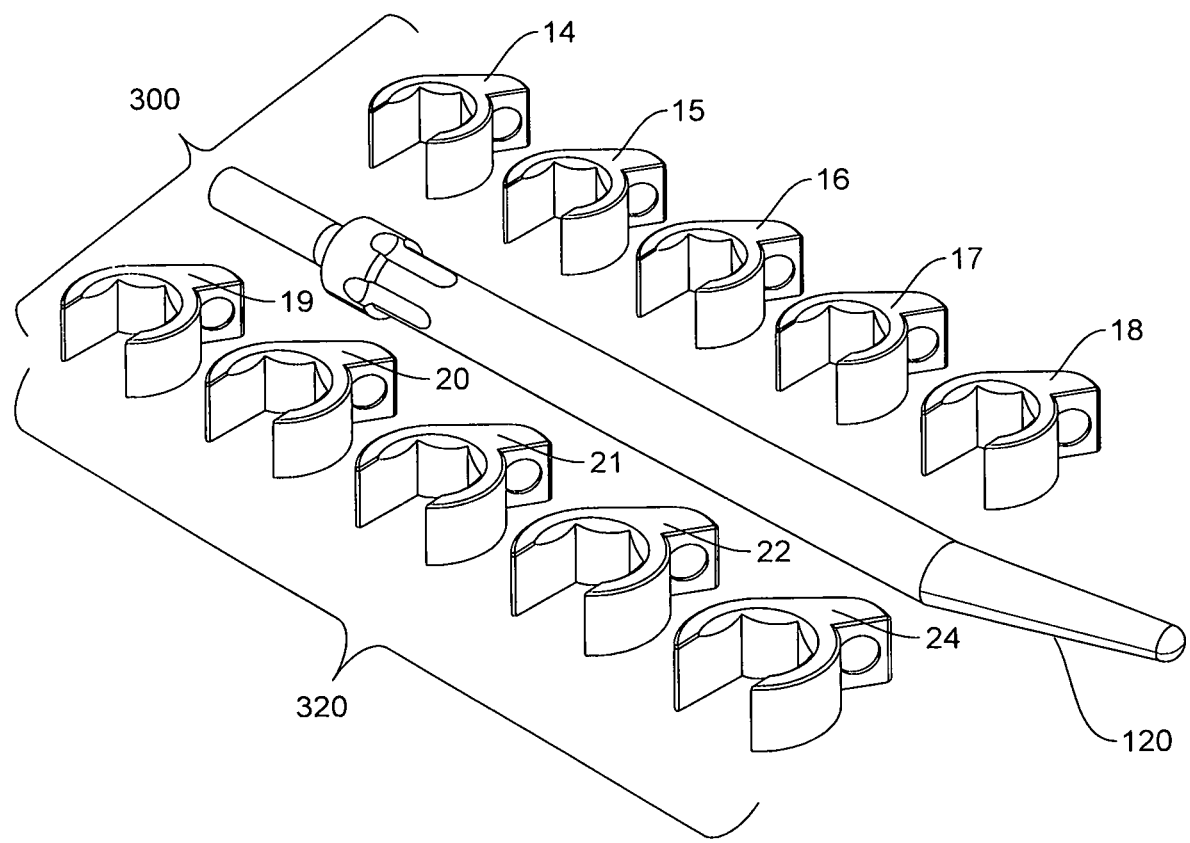
FIG. 7 is a perspective view of a socket kit 300 according to a second exemplary alternate embodiment of the present invention.

By way of an additional non-limiting example, FIG. 7 is a perspective view of a socket kit 300 according to a second exemplary alternate embodiment of the present invention. In such a kit 300 a plurality of crows feet style sockets 320 are provided, essentially replacing the plurality of slotted sockets 220 of the socket kit 200 above.

2. Operation of the Preferred Embodiment

In operation, an air impact driver 120 is connected with an otherwise conventional pneumatic impact wrench or driver tool (not shown) where the output shaft delivers repeated blows to the offset distal portion 126 rounded tool tip 127. The offset distal portion 126 provides an angular offset 128 sufficient to allow the direction of an impact force in a directly laterally offset 130 from the centerline 132 of the output shaft 124. By placing any style socket tool about a seized fastener, a rotational removal force may be delivered in a manner that can be accessed laterally from the seized fastener. The slot within the tool head may further allow for placement of the socket about an oxygen sensor or similar item.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical,* 520 US 17 (1997) or *Festo Corp. v. Shoketsu Kinzoku Kogyo Kabushiki Co.,* 535 U.S. 722 (2002), or other similar caselaw or subsequent precedent should not be made if any future claims are added or amended subsequent to this Patent Application.

What is claimed is:

1. An oxygen sensor socket kit comprising:
   an air impact driver having a proximal attachment end for connection with an impact driver tool; and
   at least one socket adapted for engaging with an oxygen sensor comprising:
      an annulus forming an inside surface having a plurality of substantially rectangular flat facets parallel to and symmetrically arranged around a central axis; and
      a slot formed completely through a socket sidewall and providing continuous fluid communication with the annulus and positioned in place of one or a portion of one of the rectangular flat facets; and
      an outer surface incorporating at least one radially offset protrusion forming a wing body and having a planar striking surface that lies along a radial projection from the central axis on a plane that intersects the central axis.

2. The oxygen sensor socket kit of claim 1, further comprising two radially offset protrusion, each positioned in spaced manner from one another at a distance coordinating with the distance between the internal rectangular flat facets.

3. The oxygen sensor socket kit of claim 2, wherein each of the striking surface forms one or more recess of a concave shape; and wherein said air impact driver further comprises:
   an output shaft forming an offset distal portion that terminates in a rounded tool tip, said offset distal portion having an angular offset sufficient to allow a direction of an impact force directly laterally offset from a centerline of the output shaft;
   wherein the rounded tool tip coordinates with and is received by the concave shape.

4. The oxygen sensor socket kit of claim 3, further comprising:
   a plurality of sockets having an overall vertical height selected from a group consisting of: a shorter overall vertical height; and a longer overall vertical height.

5. The oxygen sensor socket kit of claim 4, wherein each of said plurality of sockets is sized to receive a hexagonal head fastener of a different size.

6. The oxygen sensor socket kit of claim 2, further comprising:
   a plurality of sockets having an overall vertical height selected from a group consisting of: a shorter overall vertical height; and a longer overall vertical height.

7. The oxygen sensor socket kit of claim 6, wherein each of said plurality of sockets is sized to receive a hexagonal head fastener of a different size.

8. The oxygen sensor socket kit of claim 1, wherein each of the striking surface forms one or more recess of a concave shape; and wherein said air impact driver further comprises:
   an output shaft forming an offset distal portion that terminates in a rounded tool tip, said offset distal portion having an angular offset sufficient to allow a direction of an impact force directly laterally offset from a centerline of the output shaft;
   wherein the rounded tool tip coordinates with and is received by the concave shape.

9. The oxygen sensor socket kit of claim 8, further comprising:
   a plurality of sockets having an overall vertical height selected from a group consisting of: a shorter overall vertical height; and a longer overall vertical height.

10. The oxygen sensor socket kit of claim 9, wherein each of said plurality of sockets is sized to receive a hexagonal head fastener of a different size.

11. The oxygen sensor socket kit of claim 1, further comprising:
    a plurality of sockets having an overall vertical height selected from a group consisting of: a shorter overall vertical height; and a longer overall vertical height.

12. The oxygen sensor socket kit of claim 11, wherein each of said plurality of sockets is sized to receive a hexagonal head fastener of a different size.

13. The oxygen sensor socket kit of claim 1, further comprising a thread chaser comprising:
    a male cutting tap adapted to clean, re-form and restore a female thread;
    a female cutting tap adapted to clean, re-form and restore existing male threads; and
    a hexagonal outer surface to be matingly received within the annulus of a socket.

* * * * *